US010423958B2

(12) United States Patent
Wang et al.

(10) Patent No.: US 10,423,958 B2
(45) Date of Patent: Sep. 24, 2019

(54) METHOD, APPARATUS AND SYSTEM FOR VOICE VERIFICATION

(71) Applicant: BAIDU ONLINE NETWORK TECHNOLOGY (BEIJING) CO., LTD., Beijing (CN)

(72) Inventors: Xiaohang Wang, Beijing (CN); Yang Dong, Beijing (CN); Yong Guan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/122,263

(22) PCT Filed: Nov. 16, 2015

(86) PCT No.: PCT/CN2015/094648
§ 371 (c)(1),
(2) Date: Aug. 29, 2016

(87) PCT Pub. No.: WO2017/000476
PCT Pub. Date: Jan. 5, 2017

(65) Prior Publication Data
US 2018/0114225 A1    Apr. 26, 2018

(30) Foreign Application Priority Data

Jun. 30, 2015   (CN) .......................... 2015 1 0378018

(51) Int. Cl.
*G06Q 20/40*    (2012.01)
*G06F 21/32*    (2013.01)
(Continued)

(52) U.S. Cl.
CPC ....... *G06Q 20/40145* (2013.01); *G06F 21/32* (2013.01); *G06Q 20/325* (2013.01);
(Continued)

(58) Field of Classification Search
CPC ................ G10L 17/06; H04W 12/06
(Continued)

(56) References Cited

U.S. PATENT DOCUMENTS 7,716,055 B1 *   5/2010   McIntosh ............... G06F 21/32
                                                            704/273
2002/0190124 A1 *  12/2002  Piotrowski .......... G06Q 20/341
                                                            235/382
(Continued)

FOREIGN PATENT DOCUMENTS

CN      101662365 A     3/2010
CN      101997849 A     3/2011
(Continued)

OTHER PUBLICATIONS

International Search Report (PCT/ISA/210) dated Mar. 18, 2016, by the Chinese Patent Office as the International Searching Authority for International Application No. PCT/CN2015/094648.
(Continued)

Primary Examiner — Robert R Niquette
(74) Attorney, Agent, or Firm — Buchanan Ingersoll & Rooney PC

(57) ABSTRACT

The present invention provides a method, apparatus, and system for voice verification, wherein the method comprises: at a network side, obtaining a user voice communication number according to a voice verification request from a user side, and determining voice verification information corresponding to the voice verification request; at the network side, initiating a call to a corresponding user according to the user voice communication number, and in the case of call through, playing the determined voice verification information to the user; at the user side, performing an automatic listening and recording operation when monitoring that the user is called, and upon termination of the call, sending recording information obtained from the recording to the
(Continued)

network side; at the network side, determining a verification result according to the voice verification information and the recording information.

23 Claims, 3 Drawing Sheets

(51) Int. Cl.
| | |
|---|---|
| G06Q 20/32 | (2012.01) |
| H04L 9/32 | (2006.01) |
| H04L 29/06 | (2006.01) |
| H04M 3/38 | (2006.01) |
| G10L 17/00 | (2013.01) |
| G10L 17/06 | (2013.01) |
| G10L 17/22 | (2013.01) |
| H04W 12/06 | (2009.01) |
| H04L 29/08 | (2006.01) |
| H04M 3/42 | (2006.01) |
| H04M 3/51 | (2006.01) |
| H04M 3/22 | (2006.01) |

(52) U.S. Cl.
CPC ............ *G10L 17/005* (2013.01); *G10L 17/06* (2013.01); *G10L 17/22* (2013.01); *H04L 9/32* (2013.01); *H04L 29/06* (2013.01); *H04M 3/385* (2013.01); *H04W 12/06* (2013.01); *H04L 63/0861* (2013.01); *H04L 67/02* (2013.01); *H04M 3/2281* (2013.01); *H04M 3/42102* (2013.01); *H04M 3/5158* (2013.01); *H04M 2203/105* (2013.01); *H04M 2203/306* (2013.01); *H04M 2203/6054* (2013.01); *H04M 2203/6081* (2013.01)

(58) Field of Classification Search
USPC .......................................................... 704/44
See application file for complete search history.

(56) References Cited

U.S. PATENT DOCUMENTS

| | | | |
|---|---|---|---|
| 2004/0220807 | A9* | 11/2004 | Tamir .................... B32B 37/182 704/246 |
| 2010/0158206 | A1* | 6/2010 | Caceres ................ H04M 1/663 379/88.02 |
| 2013/0080166 | A1* | 3/2013 | Buffum .................. G06F 21/32 704/236 |
| 2015/0046340 | A1 | 2/2015 | Dimmick |
| 2015/0193776 | A1* | 7/2015 | Douglas ................ G06Q 20/02 705/16 |
| 2015/0264574 | A1 | 9/2015 | Dong et al. |

FOREIGN PATENT DOCUMENTS

| | | |
|---|---|---|
| CN | 103903622 A | 7/2014 |
| CN | 103944861 A | 7/2014 |
| CN | 104518875 A | 4/2015 |
| JP | 2005-149232 | 6/2005 |
| JP | 2006-017936 | 1/2006 |
| JP | 2008-234398 A | 10/2008 |
| KR | 20040035647 | 4/2004 |
| TW | 201026010 A | 7/2010 |

OTHER PUBLICATIONS

Written Opinion (PCT/ISA/237) dated Mar. 18, 2016, by the Chinese Patent Office as the International Searching Authority for International Application No. PCT/CN2015/094648.

* cited by examiner

METHOD, APPARATUS AND SYSTEM FOR VOICE VERIFICATION

CROSS REFERENCE OF RELATED APPLICATIONS

The present application claims a priority of the Chinese patent application No. 201510378018.X entitled "Method of voice verification, Apparatus, And System," filed on Jun. 30, 2015, contents of which are incorporated here by reference.

FIELD OF THE INVENTION

The present invention relates to a verification technology, and more specifically, to a method of voice verification, a voice verification apparatus, and a voice verification system.

BACKGROUND OF THE INVENTION

In order to safeguard user account security or user information security so as to avoid user property loss and user information leakage, verification has been widely applied to processes like network payment and user logon.

The existing verification process is usually implemented based on SMS (Short Messaging Service) messages (including MMS (Multimedia Messaging Service) messages). The specific implementation process generally comprises: searching, by a server (e.g., a payment server or a logon server) after receiving a verification request from a user equipment, a mobile telephone number reserved by a user, and generating a verification code for the verification request, which verification code may be numbers or alphabets or a combination of numbers and alphabets; sending, by the server, an SMS message containing the verification code to the user via an SMS server according to the mobile phone number reserved by the user; entering, by the user after receiving the SMS, the verification code in the SMS in an input box on a corresponding page; verifying, by the server after receiving the verification code from the user equipment, according to the previously generated verification code and the received verification code. A verification result is mainly for the server to decide a subsequent procedure (e.g., subsequent logon procedure or payment procedure, etc.).

During the process of creating the present invention, the inventors find that although existing verification manners can to some extent avoid security issues to the user account and user information due to illegal behaviors including network attack and forgery of verification requests, they still need improvement to address issues like inconvenience, uncertainty, and single verification means. Specifically, because SMS messages are sent via a storage and forwarding mechanism, the SMS server does not know the status of recipients (e.g., whether a recipient is power on or within a signal coverage area) when sending SMS messages, such that the time for a recipient to receive an SMS message is unpredictable, which adds uncertainty to the verification process; in normal circumstances, it takes about 5~10 seconds to send a SMS to the user, the user needs to wait until the verification code is received; furthermore, the existing verification method is inconvenient as it needs the user to manually enter the received verification code, the manual entry of the verification code could also introduce artificial defects during the verification process, further degrading the convenience of the verification process.

SUMMARY OF THE INVENTION

An objective of the present invention is to provide a method, apparatus and system for voice verification.

According to one aspect of the present invention, there is provided a method of voice verification, and the method comprising steps of: at a network side, obtaining a user voice communication number according to a voice verification request from a user side, and determining voice verification information corresponding to the voice verification request; at the network side, initiating a call to a corresponding user according to the user voice communication number, and in the case of call through, playing the determined voice verification information to the user; at the user side, performing an automatic listening and recording operation when monitoring that the user is called, and upon termination of the call, sending recording information obtained from the recording to the network side; at the network side, determining a verification result according to the voice verification information and the recording information.

According to another aspect of the invention, there is provided a method of voice verification, comprising steps of: sending a voice verification request to a network side; monitoring a call from the network side to a user, and in the case of monitoring that the user is called, performing automatic listening and recording operation so as to obtain voice verification information performed by the network in response to the voice verification request; upon termination of the call, sending recording information obtained from recording to the network side, such that the network side performs voice verification according to the recording information.

According to another aspect of the invention, there is provided A method of voice verification, comprising steps of: obtaining a user voice communication number according to a voice verification request from a user side, and determining voice verification information corresponding to the voice verification request; initiating a call to a corresponding user according to the user voice communication number, and in the case of call through, playing the voice verification information to the user; determining a voice verification result according to the voice verification information and recording information received from the user side, wherein the recording information refers to: at the user side, information obtained from performing an automatic listening and recording operation when monitoring that the user is called.

According to an aspect of the invention, there is provided an apparatus for voice verification, provided at a user side, wherein the apparatus comprises: a voice verification requesting module adapted to send a voice verification request to a network side; a monitoring recording module adapted to monitor a call from the network side to a user, and perform automatic listening and recording operation in the case of monitoring that the user is called, so as to obtain voice verification information played by the network side in response to the voice verification request; and upon termination of the call, send recording information obtained from recording to the network side such that the network side performs voice verification according to the recording information.

According to another aspect of the invention, there is provided an apparatus for voice verification, provided at a network side, wherein the apparatus comprises: a control module adapted to obtain a user voice communication number according to a voice verification request from a user side, and determine voice verification information corresponding to the voice verification request; a call module adapted to initiate a call to a corresponding user according to the user voice communication number, and in the case of call through, play the voice verification information to the user; a voice verification module adapted to determine a voice verification result according to the voice verification information and recording information received from the user side, wherein the recording information refers to: at the user side, information obtained from performing an automatic listening and recording operation when monitoring that the user is called.

According to a still further aspect of the present invention, there is further provided a voice verification system, the system comprising the aforementioned apparatus for voice verification provided at the user side and the apparatus for voice verification provided at the network side.

Compared with the prior art, the present invention has the following advantages: by initiating a call to a user in response to a voice verification request from a user side and playing voice verification information to the user, the network side may clearly know a status of the user side and whether voice verification information has been successfully played to the user side, the present invention avoids uncertainty to a certain extent to the verification process caused by the network side being unable to know the user status. By making the user side perform operations like monitoring, automatic listening, automatic voice recording, and automatic transmission of the recording information to the network work, according to embodiments of the present invention the information that needs verification (i.e., recording information) might be automatically sent back to the network side without introducing a manual operation, such that the network side may quickly and smoothly perform the subsequent voice verification operation, which avoids issues like the inconvenience of the verification process caused by manual entry of the verification code, the user having to wait for reception of the information that needs verification, and introduction of artificial faults into the verification process, and the like. Therefore, it is seen that the technical solution provided by the present invention enhances the convenience of verification, reduces the uncertainty, and enriches implementation manners of the verification.

BRIEF DESCRIPTION OF THE PREFERRED EMBODIMENTS

By reading detailed depiction of the non-limitative embodiments with reference to the accompanying drawings, other features, objectives and advantages of the present invention will become more apparent:

In the drawings, same or similar reference numerals represent same or similar components.

DETAILED DESCRIPTION OF THE PREFERRED EMBODIMENTS

Figure 1:
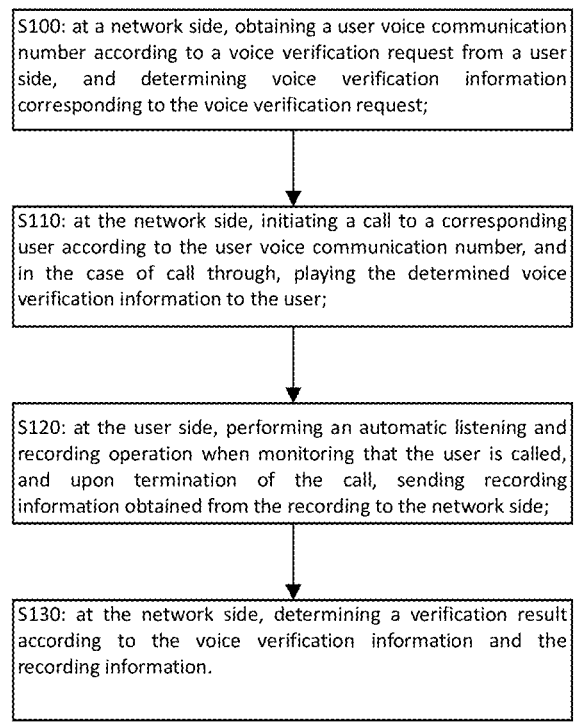
FIG. 1 illustrates a flow diagram of a method of voice verification according to a first embodiment of the present invention.

It should be mentioned before discussing the exemplary embodiments in more detail that some exemplary embodiments are described as processing or methods in the form of flow diagrams. Although a flow diagram depicts respective operations as being sequentially processed, many operations therein may be implemented in parallel, concurrently or simultaneously. Besides, Various operations may be re-ordered. When the operations are completed, the processing may be terminated. However, there may comprise additional steps not included in the accompanying drawings. The processing may correspond to a method, a function, a specification, a sub-routine, a sub-program, etc.

The "server" referred to in the context may comprise: a logical server or an entity server; the entity server may also be referred to as a "network device," i.e., an intelligent electronic device that is provided at the network side and that may perform predetermined processing procedures like numerical value computation and/or logical computation by executing a predetermined program or instruction. The network device may comprise a processor and a memory, wherein the processor executes pre-stored program instructions to perform a predetermined processing procedure; the predetermined processing procedure may also be performed by hardware such as ASIC, FPGA, and DSP, or performed by a combination of the instructions and the hardware.

The entity server may be a small tablet device or a large tablet device. It needs to be noted that the server is only an example, and other existing or future possibly emerging network devices, if applicable to the present invention, should also be included within the protection scope of the present invention and are incorporated here by reference.

The methods discussed infra (some of which are illustrated through flow diagrams) may generally be implemented through hardware, software, firmware, middleware, microcode, hardware description language or any combination thereof. When they are implemented with software, firmware, middleware or microcode, the program code or code segment for executing necessary tasks may be stored in a machine or a computer readable medium (e.g., storage medium). (One or more) processors may implement the necessary tasks.

The specific structures and function details disclosed here are only representative, for a purpose of describing the exemplary embodiments of the present invention. Instead, the present invention may be specifically implemented through many alternative embodiments. Therefore, it should not be appreciated that the present invention is only limited to the embodiments illustrated here.

However, it should be understood that although terms like "first" and "second" might be used here to describe respective units, these units should not be limited by these terms. Use of these terms is only for distinguishing one unit from another. For example, without departing from the scope of the exemplary embodiments, a first unit may be referred to as a second unit, and similarly the second unit may be referred to as the first unit. The term "and/or" used here includes any and all combinations of one or more associated items as listed.

It should be understood that when one unit is "connected" or "coupled" to a further unit, it may be directly connected or coupled to the further unit, or an intermediate unit may exist. In contrast, when a unit is "directly connected" or "directly coupled" to a further unit, an intermediate unit does not exist. Other terms (e.g., "disposed between" VS. "directly disposed between," "adjacent to" VS. "immediately adjacent to," and the like) for describing a relationship between units should be interpreted in a similar manner.

The terms used here are only for describing preferred embodiments, not intended to limit exemplary embodiments. Unless otherwise indicated, singular forms "a" or "one" used here are also intended to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

Hereinafter, the present invention will be described in further detail in conjunction with the drawings.

Embodiment 1: Method of Voice Verification

FIG. 1 illustrates a flow diagram of a method of voice verification of the present embodiment; the method as illustrated in FIG. 1 mainly comprises step S100, step S110, step S120, and step S130. Hereinafter, respective steps in FIG. 1 will be illustrated.

S100: at a network side, obtaining a user voice communication number according to a voice verification request from a user side, and determining voice verification information corresponding to the voice verification request.

Specifically, the network side pre-stores a plurality of user voice communication numbers reserved by users. These user voice communication numbers form a set of communication numbers. The network side may obtain a user voice communication number corresponding to the voice verification request from the pre-stored set of communication numbers. In a specific example, the set of communication numbers at the network side comprises a plurality of correspondence relationships between user voice communication numbers and the user identifiers (e.g., user logon accounts or user payment account information, etc.; hereinafter, the explanation will be made with the user payment account information as an example). The network side, when receiving a voice verification request from the user side, may first obtain the user payment account information from the information carried in the voice verification request; then, the network side performs matching and searching from the set using the user account payment information so as to obtain a user voice communication number corresponding to the user payment account information. The present embodiment is not limited to the specific implementation of obtaining, at the network side, a user voice communication number according to the voice verification request.

The user voice communication number obtained in the present embodiment is mainly for establishing a voice call connection between the network side and the user side. The user voice communication number in the present embodiment may be the user's mobile phone number.

In one application scenario, in the present embodiment, the user device corresponding to the user voice communication number and the user equipment sending the voice verification request are the same user equipment, e.g., the user uses his/her smart mobile phone (or a tablet computer having a phone function) to perform a payment operation or a logon operation and the like, and the number (i.e., the user's mobile phone number) of the smart mobile phone (or a tablet computer having a phone function) is just the user voice communication number corresponding to the user identifier (e.g., the user logon account or user payment account information, etc.).

In another application scenario, in the present embodiment, the user equipment corresponding to the user voice communication number is not the user equipment sending the voice verification request, e.g., the user uses his/her smart phone (or a tablet computer having a phone function) to perform a payment operation or a logon operation and the like, while the user voice communication number corresponding to the user identifier information stored in the network side is the number of the user's smart phone; in another example, the user performs a payment operation using a smart phone, while the number of the smart phone (i.e., the user's mobile phone number) is not the user voice communication number corresponding to the user identifier information (e.g., the user's logon account or the user payment account information), i.e., the user voice communication number corresponding to the user identifier information is not identical to the number of the smart mobile phone number used by the user to perform the payment operation or logon operation.

In the present embodiment, the voice verification information determined at the network side for different voice verification requests within a certain period of time (e.g., several hours or dozens of hours or several days) is usually not repetitive. In other words, the network side of the present invention should guarantee that different voice verification requests should correspond to different voice verification information within a certain period of time.

A specific example of determining, by the network side of the present embodiment, the voice verification information corresponding to the voice verification request is provided below: the network side pre-stores a plurality of audio files (which may also be referred to as voice files), and characteristics of the plurality of audio files differ greatly; all audio files may form an audio file set; when receiving the voice verification request, the network side randomly selects an audio file from the audio file set, and uses the randomly selected audio file as the voice verification information corresponding to the voice verification request.

Another specific example of determining, by the network side of the present embodiment, the voice verification information corresponding to the voice verification request is provided below: the network side, after receiving the voice verification request, randomly generates an audio file and uses the randomly generated audio file as the voice verification information corresponding to the voice verification request. The manner of randomly generating an audio file at the network side may be: randomly capturing a small segment of audio information from a pre-stored audio file, thereby generating a new audio file, which new audio file is just the randomly generated audio file. The manner of randomly generating an audio file at the network side may also be: randomly combining two or more pre-stored audio files into a new audio file, which new audio file is just the randomly generated audio file.

The present embodiment has no limitation on the specific implementation manner for the network side to determine the voice verification information corresponding to a voice verification request, to the specific format of the audio file, or to the specific implementation manner for the network side to randomly generate an audio file, etc.

The voice verification information of the present embodiment may be used for playing musical voice verification information or for playing voice verification information in the form of numbers and/or alphabets and/or words and/or Chinese characters; besides, the duration of playing the voice verification information is usually very short, e.g., generally 1-5 seconds, etc. The present embodiment does not limit the specific content played by the voice verification information or the time length of playing the voice verification information.

In the present embodiment, all voice verification information has corresponding unique identifiers, i.e., one voice verification information may be uniquely determined using one identifier. The identifier may be referred to as the identifier of the voice verification information. The identifier corresponding to the voice verification information may specifically be a file name of an audio file or a combination of the storage path of the audio file and the file name, or an index value of the audio file, or an identifier randomly generated using a random generation algorithm. The present embodiment is not limited to the specific representation form of the identifier of the voice verification information.

The identifier corresponding to the voice verification information in the present embodiment may be used for a verification process (e.g., payment verification process); and by adding an identifier in a voice matching algorithm, accuracy of the voice verification result may be further guaranteed.

In one embodiment, while determining the voice verification information corresponding to the voice verification request, the network side may also obtain an identifier corresponding to the voice verification information, for example, obtaining a file name or index value of the audio file as the voice verification information, and for another example, obtaining a storage path and a file name of the audio file as the voice verification information, and etc.; then, the network side may provide the identifier corresponding to the voice verification information to the user side. In usual circumstances, the network side may provide the identifier corresponding to the determined voice verification information to a user equipment which sends the voice verification request at the user side. In the case that the user equipment sending the voice verification request is not the user equipment corresponding to the user voice communication number, the user equipment sending the voice verification request may provide the identifier corresponding to the voice verification information sent from the network side to the user equipment corresponding to the user voice communication number, e.g., the user equipment sending the voice verification request provides, via a wireless transmission manner such as WiFi or Bluetooth, the identifier corresponding to the voice verification information to the user equipment corresponding to the user voice communication number; for another example, the user equipment sending the voice verification request displays a two-dimensional code, such that the user equipment corresponding to the user voice communication number may obtain the identifier corresponding to the voice verification information by scanning the two-dimensional code; of course, the user equipment sending the voice verification request may also adopt other convenient transmission manner to provide the identifier corresponding to the voice verification information sent from the network side to the user equipment corresponding to the user voice communication number; in addition, the user equipment sending the voice verification request, when sending the identifier, may also provide recipient information for the voice verification request to the user equipment corresponding to the user voice communication number, such that the user equipment corresponding to the user voice communication number may know the recipient of the recording information obtained from subsequent recording. The present embodiment does not limit the specific implementation manner regarding how the user equipment sending the voice verification request provides the identifier corresponding to the voice verification information sent from the network side to the user equipment corresponding to the user voice communication number.

It should be particularly noted that although in an actual application scenario, the network side of the present embodiment may provide an identifier corresponding to the voice verification information to the user side, it does not mean that the network side of the present embodiment has to provide the identifier corresponding to the voice verification information to the user side, i.e., when the network side does not provide the identifier corresponding to the voice verification information to the user side, the verification procedure of the present embodiment can also be implemented.

S110: at the network side, initiating a call to a corresponding user according to the user voice communication number, and in the case of call through, playing the determined voice verification information to the user.

Specifically, the network side of the present embodiment may perform a corresponding call operation according to the user voice communication number so as to establish a voice call connection (i.e., voice link) with the user side. The network side of the present embodiment may establish a voice call connection with the user side employing an existing call manner, e.g., the network side connects an IP (Internet Protocol) network with a PSTN (Public Switched Telephone Network); or the network side establishes a voice call connection with the user side using an IVR (Interactive Voice Response) technology. When successfully establishing a voice call connection (e.g., the user answers an incoming call) with the user side, the network side plays the voice verification information determined above to the user based on the voice call connection. The present embodiment does not limit the specific implementation manner of initiating, by the network side, a call to a corresponding user, and playing, by the network side, the voice verification information to the user through the voice call connection.

The network side of the present embodiment provides a call repeating function so as to be capable of successfully playing the voice verification information to the user, e.g., in the case that a voice call connection fails to be successfully established for the user's current call or although a voice call connection has been successfully established for the user's current call, the voice verification information fails to be successfully played, the network side should perform the call function again for the user.

A specific example of repeating a call at the network side is that: if the network side cannot determine a subscription location of the user voice communication number, the network side may perform adjustment to the user voice communication number (e.g., deciding how to adjust the user voice communication number based on the specific failure reasons corresponding to the current call), and re-perform the operation of calling the user after the adjustment; for example, the network side dials 0 before the user voice communication number, and calls the user again; for another example, the network side deletes the 0 added before the user voice communication number, and calls the user again.

Another specific example of repeating a call at the network side is that: if abnormality occurs to the caller number used by the current call (e.g., the caller number is screened by the PSTN, etc.), the network side may perform the operation of calling the user again using other caller number.

In other words, a plurality of caller numbers are provided in the network side; in the case that the network side fails to successfully establish a voice call connection with the user side due to the cause from the caller number, the network side should change a caller number, and try again to establish a voice call connection with the user side using the new caller number.

A further specific example of repeating a call at the network side is that: when the network side has successfully established a voice call connection with the user side for the current call, but fails to successfully play the voice verification information due to reasons like connection interruption, the network side may perform the operation of calling the user again so as to be capable of successfully playing the voice verification information.

S120. at the user side, performing automatic listening and recording operation when monitoring that the user is called, and upon termination of the call, sending recording information obtained from the recording to the network side.

Specifically, the user side may enter into a call monitoring status after sending the voice verification request, e.g., the user side enters into the call monitoring status after initiating a verification service; when monitoring that there is an incoming call, the user side automatically performs an listening operation, and records the audio signal played in the voice call connection by invoking a recording service and the like; upon termination of the call (e.g., the call is hung-up), the user side automatically sends a voice verification message containing recording information to the network side, e.g., the network side sends the recording information to the network side through HTTP (HyperText Transfer Protocol), such that the network side may perform a voice verification operation for the voice verification message.

In order to avoid performing automatic listening and recording operation to other calls (calls irrelevant to verification), the user side in the present embodiment pre-stores a call-monitored whitelist, and the user side will only perform automatic listening and automatic recording operation when the calling party of the monitored call belongs to a calling party in the pre-stored call whitelist; otherwise, the user side does not perform automatic listening and automatic recording operation.

If the user side receives the identifier corresponding to the voice verification information sent from the network side, the user side may send the recording information, together with the received identifier, to the network side, e.g., the user side sends an HTTP-based voice verification message containing the recording information and the identifier to the network side.

Continued with the above example, when the user equipment sending the voice verification request is not the user equipment corresponding to the user voice communication number, the user equipment corresponding to the user voice communication number, after receiving the identifier corresponding to the voice verification information sent from the user equipment sending the voice verification request and the recipient information for the voice verification request, buffers the identifier and the recipient information in the voice verification request, and sends the identifier and recording information together to the network side based on the recipient information when sending the recording information to the network side.

S130. at the network side, determining a verification result according to the voice verification information and the recording information.

Specifically, the network side may performing the operation of voice matching after pre-processing the recorded information received thereby so as to enhance the accuracy of voice matching operation. The pre-processing here refers to a noise reduction processing and a normalization processing.

A specific example of determining a verification result in the present embodiment is that: the network side performs voice matching between the received recording information and respective voice verification information stored at the network side, respectively, and when the voice verification information matching the recording information is the voice verification information previously determined by the network side, determines that the voice verification at this time passes; otherwise, it is determined that the voice verification at this time fails.

Another specific example of determining a verification result in the present embodiment is that: the network side performs voice matching between the received recording information and the voice verification information previously determined by the network side, and when the voice matching result is that they match, determines that the voice verification at this time passes, while when the voice matching result is that they do not match, determines that the voice verification at this time fails.

In the case that the network side not only receives the recording information, but also receives the identifier corresponding to the voice verification information sent from the user side, a specific example of determining a verification result in the present embodiment is that the network singles out part of voice verification information from all voice verification information stored at the network side according to the received identifier, performs voice matching between the received recording information and the part of voice verification information, respectively, and when the voice verification information matching the recording information is the voice verification information previously determined by the network side, determines that the voice verification at this time passes; otherwise, determines that the voice verification at this time fails.

The network side may also adopt other manners to perform voice verification using the identifier and the recording information, e.g., in the case of determining that the identifier sent from the user matches the identifier as previously determined and the recording information also matches the voice verification information as previously determined, determining that the voice verification at this time passes; otherwise, determining that the voice verification at this time fails.

It is seen from the depiction above that the identifier corresponding to the voice verification information in the embodiment may act as an auxiliary information during the process of determining a voice verification, e.g., it may reduce the times of voice matching or may act as a condition for determining a voice verification.

The voice matching process of the present embodiment may comprise: extracting features in the recording information, and comparing the extracted features with features in the voice verification; features of respective voice verification information in the present embodiment may be pre-extracted and stored at the network side. The voice matching process of the present embodiment may also comprise: performing voice recognition to the recording information, and comparing a result of voice recognition to the recording information with a result of voice recognition to the voice verification information; the voice recognition results of respective voice verification information in the present embodiment may be voice recognition performed in advance and stored at the network side. Of course, the present embodiment may also employ other voice matching algorithm to perform voice matching. The present embodiment does not limit the specific implementation manner of voice matching.

When the voice verification passes, the network side may enter a subsequent processing procedure (e.g., subsequent payment procedure or subsequent user logon procedure, etc.). In addition, when the present payment procedure is completed (regardless of success or failure) or the logon procedure is completed (regardless of logon failure or logon success), the user side may not monitor the user call any longer, e.g., the user side closes the currently started monitoring service, etc.

Embodiment 2: Method of Voice Verification

Figure 2:
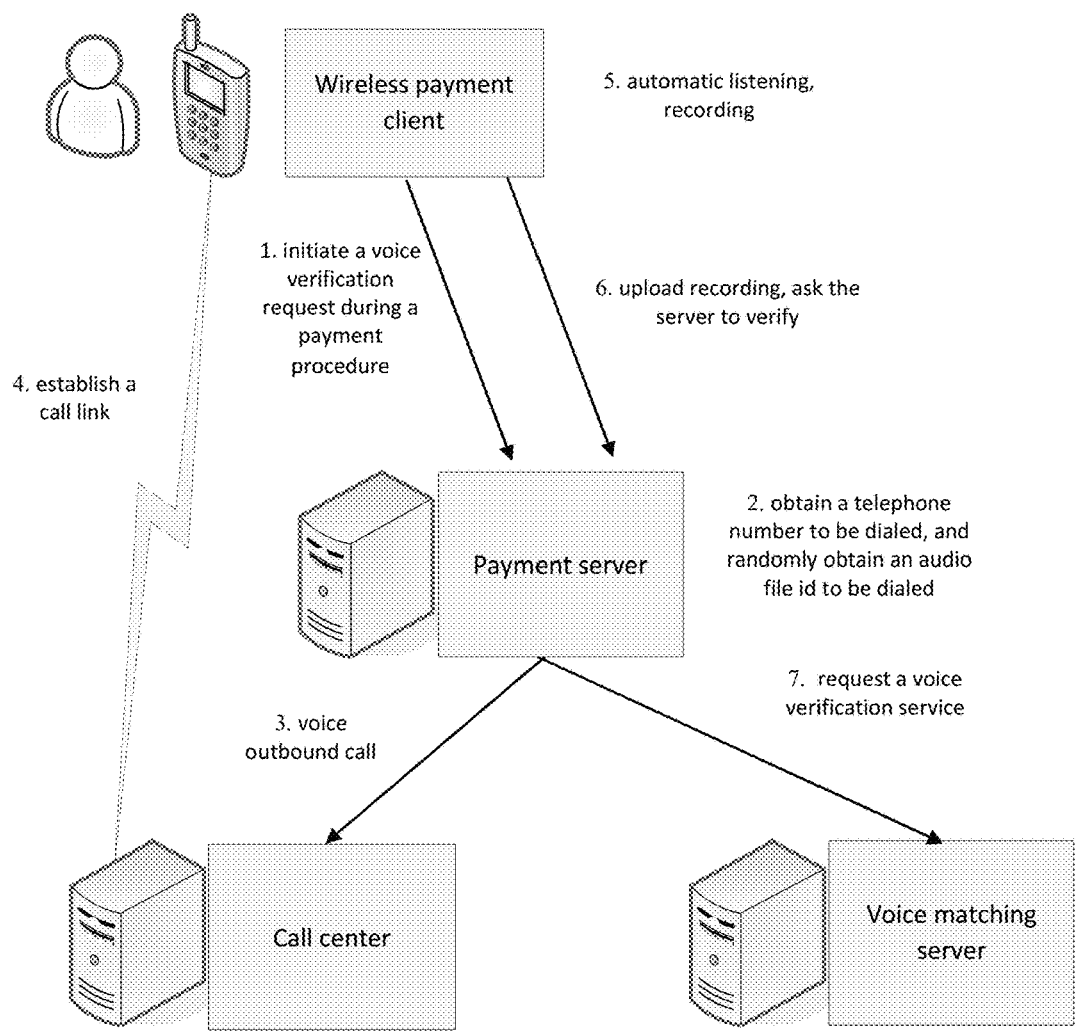
FIG. 2 illustrates a flow diagram of a method of voice verification according to a second embodiment of the present invention.

The present embodiment takes an example of performing network payment by the user with a smart mobile phone, and illustrates a method of voice verification of the present embodiment with reference to FIG. 2. In the present embodiment, the number of the smart mobile phone used by the user is the user voice communication number corresponding to the user payment account information reserved by the user at the network side.

In FIG. 2, the smart mobile phone belongs to the user side. A wireless payment client is provided within the smart mobile phone. A payment server, a call center, and a voice matching server belong to the network side.

The wireless payment client in the present embodiment may be specifically in a form of a mobile payment SDK (Software Development Kit) or an APP product in the smart mobile phone; the payment server, the call center, and the voice matching server in the present embodiment may be centrally provided in a same set of network device (e.g., server), or may be separately disposed in two or three sets of different network devices. The present embodiment is not limited to specific representation forms of the wireless payment client, the payment server, the call center and the voice matching server.

Step 1: During the network payment process, the wireless payment client initiates a voice verification request and starts monitoring an incoming call of the smart mobile phone where it is located, e.g., the wireless payment client monitors an incoming call by starting a call status monitoring service.

Step 2. When receiving a voice verification request from the wireless payment client, the payment server searches a smart mobile phone number corresponding to the voice verification request from information (e.g., a set of correspondence relationships between the user payment account information and the smart mobile phone number) stored in its locality according to the information (e.g., the user payment account information) carried in the voice verification request; the payment server randomly selects an identifier from a set of identifiers of the audio files it pre-stores, and provides the identifier to the wireless payment client.

All audio files in the present embodiment may be stored in the payment server or stored in the call center. Of course, all audio files may be also stored in other locations independent of the payment server and the call center.

Step 3. The payment server provides the smart mobile phone number it finds and the randomly selected identifier to the call center so as to call a corresponding user through the call center, and plays voice verification information corresponding to the identifier to the user. The payment server may provide the identifier and the smart mobile phone number to the call center through a Web Service interface provided by the call center, thereby implementing HTTP layer-based outbound call interface invoking.

Step 4: The call center performs a call operation based on the smart mobile phone number provided by the payment server so as to establish a voice call connection (i.e., establishing a call link) with the smart mobile phone of the user side. After the voice call connection is successfully established, the call center plays corresponding voice verification information (e.g., an audio file) according to the identifier provided by the payment server, e.g., the call center selects an audio file corresponding to the identifier from the locally stored audio files according to the identifier; then plays the audio file after the voice call connection is successfully established.

Step 5. The wireless payment client in the smart mobile phone, when monitoring that the user is called and the caller belongs to a whitelist stored in the wireless payment client, performs automatic listening, and performs an automatic recording operation so as to record the voice verification information played by the call center.

Step 6. The wireless payment client automatically uploads, upon termination of this call, the recording information it records and the identifier provided by the payment server through an HTTP-based voice verification message.

Step 7. The payment server provides the received recording information and identifier together to the voice matching server so as to request the voice matching server to perform a voice matching operation. The voice matching server also stores all voice verification information. All of the voice verification information at the call center should be identical to all voice verification information stored at the voice matching server, e.g., when updating its voice verification information, the voice matching server should synchronously update all voice verification information at the call center. The voice matching server may determine part of voice verification information in all voice verification information according to the received identifier, perform voice matching between the recording information and the part of voice verification information one by one, and provide the matched voice verification information or an identifier (e.g., audio file name) of the voice verification information to the payment server. The payment server determines that this voice verification passes when determining that the voice verification information is consistent with the previously determined voice verification information or determining that the identifier sent from the voice matching server is identical to the identifier of the previously determined voice verification information; otherwise, it determines that this voice verification fails. The payment server may decide a subsequent payment flow based on a result of the voice verification.

After this payment process ends, the wireless payment client should not monitor the user's incoming calls any longer, e.g., the wireless payment client closes a phone call status monitoring service, etc.

Embodiment 3: Voice Verification System

Figure 3:
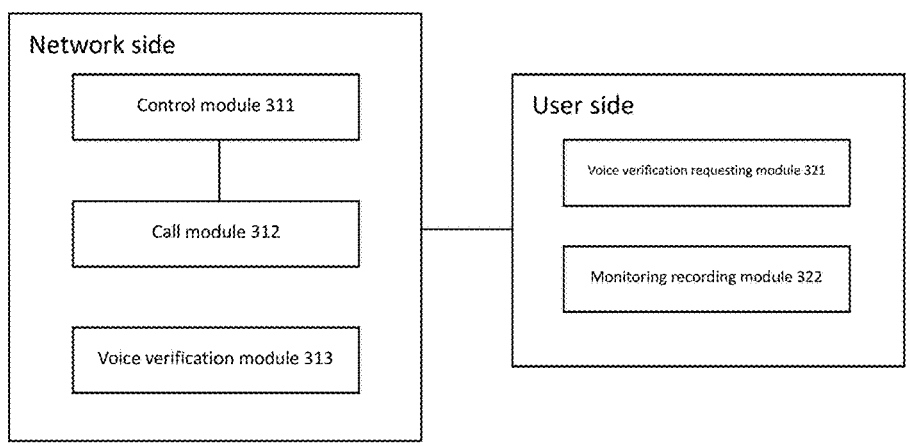
FIG. 3 illustrates a schematic diagram of a voice verification system according to a third embodiment of the present invention.

A main structure of the voice verification system of the present embodiment is illustrated in FIG. 3.

The voice verification system in FIG. 3 mainly comprises: a control module 311, a call module 312, a voice verification module 313, a voice verification requesting module 321, and a monitoring recording module 322; wherein the control module 311, the call module 312, and the voice verification module 313 are provided at the network side, while the voice verification requesting module 321 and the monitoring recording module 322 are provided at the user side.

The control module 311, call module 312, and voice verification module 313 in the present embodiment may be integrated into a same device at the network side, or separately disposed in two or three mutually independent devices at the network side.

The voice verification requesting module 321 and the monitoring recording module 322 in the present embodiment may be provided in the same user equipment at the user side, e.g., both are disposed in the same smart mobile phone of the user; the voice verification requesting module 321 and the monitoring and recording module 322 may also be provided in two mutually independent user equipments, e.g., the voice verification requesting module 321 is provided in a PC machine or a tablet computer, while the monitoring and recording module 322 is provided within the smart mobile phone.

Hereinafter, respective modules included in the voice verification system will be explained in detail hereinafter.

The voice verification requesting module 321 is mainly adapted to send a voice verification request to the network side.

Specifically, in an application scenario that needs verification, the voice verification requesting module 321 is triggered to send a voice verification request to the network side, e.g., during a procedure of logging onto a website at the user side, the voice verification requesting module 321 is triggered to send a voice verification request to the network side; for another example, during a procedure of performing network payment at the user side, the voice verification requesting module 321 is triggered to send a voice verification request to the network side.

The voice verification request sent by the voice verification requesting module 321 to the network side is usually an HTTP-based voice verification request, and the voice verification request usually carries a user identifier that may uniquely characterize a user, e.g., user logon account or user payment account information, etc.

The control module 311 is mainly adapted to obtain a user voice communication number based on a voice verification request from the user side, and determine voice verification information corresponding to the voice verification request.

Specifically, the control module 311 pre-stores a plurality of user voice communication numbers reserved by a user. These user voice communication numbers form a set of communication numbers. The control module 311 may obtain a user voice communication number corresponding to the voice verification request from the set of pre-stored communication numbers. As a specific example, the control module 311 pre-stores correspondence relationships between user voice communication numbers and user identifiers (e.g., the user logon account or user payment account information, etc.; hereinafter, the explanation will be made with the user payment account information as an example), and a plurality of correspondence relationships form a set of communication numbers. When receiving a voice verification request from the user side, the control module 311 may first obtain the user payment account information from the information carried in the voice verification request; then, the control module 311 performs matching and searching in accordance with the correspondence relationships in the set using the user account payment information so as to obtain a user voice communication number corresponding to the user payment account information. The present embodiment is not limited to the specific implementation manner of obtaining, by the control module 311, a user voice communication umber according to the voice verification request.

The user voice communication number obtained by the control module 311 is mainly for establishing a voice call connection between the network side and the user side. The user voice communication number obtained by the control module 311 may be the user's mobile phone number.

In one application scenario, the user equipment corresponding to the user voice communication number obtained by the control module 311 is the user equipment where the voice verification request module 321 is located. In another application scenario, the user equipment corresponding to the user voice communication number obtained by the control module 311 is not the user equipment where the voice verification request module 321 is located. Specific examples of the two application scenarios have been described in Embodiment 1 above, which will not be repeated here.

In the present embodiment, the voice verification information determined by the control module 311 for different voice verification requests within a certain period of time (e.g., several hours or dozens of hours or several days) is usually not repetitive. In other words, the control module 311 should guarantee that different voice verification requests should correspond to different voice verification information within a certain period of time.

A specific example of determining, by the control module 311, voice verification information corresponding to the voice verification request is provided below: the network side pre-stores a plurality of audio files, and features of the plurality of audio files differ from each other greatly. all audio files may form a audio file set. When receiving the voice verification request, the control module 311 randomly selects an audio file from the audio file set, and uses the randomly selected audio file as the voice verification information corresponding to the voice verification request.

Another specific example of determining, by the control module 311, the voice verification information corresponding to the voice verification request is provided below: the control module 311, after receiving the voice verification request, randomly generates an audio file and uses the randomly generated audio file as voice verification information corresponding to the voice verification request. The manner of randomly generating an audio file by the control module 311 may be: randomly capturing a small segment of audio information from a pre-stored audio file, thereby generating a new audio file, which new audio file is just the randomly generated audio file. The manner of randomly generating an audio file by the control module 311 may also be: randomly combining two or more pre-stored audio files into a new audio file, which new audio file is just the randomly generated audio file.

The present embodiment has no limitation on the specific implementation manner for the control module 311 to determine voice verification information corresponding to a voice verification request, the specific format of the audio file, or the specific implementation manner for the control module 311 to randomly generate an audio file.

The voice verification information of the present embodiment may be used for playing musical voice verification information or for playing voice verification information in forms of numbers and/or alphabets and/or words and/or Chinese characters. Besides, the time length of playing the voice verification information is usually very short, e.g., generally 1-5 seconds. The present embodiment does not limit the specific content played by the voice verification information or the time length of playing the voice verification information.

In the present embodiment, all voice verification information has corresponding unique identifiers, i.e., one voice verification information may be uniquely determined using one identifier. The identifier may be referred to as the identifier of voice verification information. The identifier corresponding to the voice verification information may specifically be a file name of an audio file or a combination of a storage path and the file name of the audio file, or an index value of the audio file, or an identifier randomly generated using a random generation algorithm. The present embodiment is not limited to the specific representation form of the identifier of the voice verification information.

The identifier corresponding to the voice verification information in the present embodiment may be used for a verification process (e.g., payment verification process); by adding an identifier in a voice matching algorithm, accuracy of the voice verification result may be further guaranteed.

In one embodiment, while determining the voice verification information corresponding to the voice verification request, the control module 311 may also obtain an identifier corresponding to the voice verification information, for example, obtaining a file name or index value of the audio file as the voice verification information, and for another example, obtaining a storage path and the file name of the audio file as the voice verification information, and etc.; then, the control module 311 may provide the identifier corresponding to the voice verification information to the user side. In usual circumstances, the control module 311 may provide the identifier corresponding to the determined voice verification information to the voice verification requesting module 321. The voice verification requesting module 321 should provide the identifier corresponding to the voice verification information sent from the control module 311 to the monitoring recording module 322; in the case that the voice verification requesting module 321 and the monitoring recording module 322 are not provided at the same user equipment, the voice verification requesting module 321 may provide the identifier corresponding to the voice verification information to the monitoring recording module 322 via a wireless transmission manner such as Wi-Fi or Bluetooth; the voice verification requesting module 321 may also display a two-dimensional code, such that the monitoring recording module 322 may obtain the identifier corresponding to the voice verification information by scanning the two-dimensional code; of course, the voice verification requesting module 321 may also adopt other convenient transmission manner to provide the identifier corresponding to the voice verification information sent from the control module 311 to the monitoring recording module 322; in addition, the voice verification requesting module 321, when sending the identifier, may also provide recipient information for the voice verification request to the monitoring recording module 322, such that the monitoring recording module 322 may know the recipient for the recording information obtained from subsequent recording. The present embodiment does not limit the specific implementation manner regarding how the voice verification requesting module 321 provides the identifier corresponding to the voice verification information sent from the network side to the monitoring recording module 322.

It should be particularly noted that although in an actual application scenario, the control module 311 of the present embodiment may provide an identifier corresponding to the voice verification information to the user side, it does not mean that the control module 311 of the present embodiment has to provide the identifier corresponding to the voice verification information to the user side, i.e., when the control module 311 does not provide the identifier corresponding to the voice verification information to the user side, the verification procedure of the present embodiment can also be absolutely implemented.

The call module 312 is mainly adapted to initiate a call to a corresponding user according to the user voice communication number obtained by the control module 311, and in the case of call through, play the determined voice verification information to the user.

Specifically, the call module 312 establishes a voice call connection (i.e., voice link) between the network side and the user side by performing a call operation according to the user voice communication number. The call module 312 may establish a voice call connection with the user side employing an existing call manner, e.g., the call module 312 establishes a voice call connection with the user side using an IVR technology when the IP network is connected to the PSTN.

In the case of successfully establishing a voice call connection (e.g., the user answers an incoming call) at the user side, the call module 312 plays the voice verification information determined above to the user based on the voice call connection. The present embodiment does not limit the specific implementation manner of initiating, by the call module 312, a call to a corresponding user, and playing, by the call module 312, the voice verification information to the user through the voice call connection.

The call module 312 provides a call repeating function so as to successfully play the voice verification information to the user, e.g., in the case that a voice call connection fails to be successfully established for the current call of the user or although a voice call connection has been successfully established for the current call of the user, the voice verification information fails to be successfully played, the call module 312 should re-perform the call function for the user.

A specific example of repeating a call by the call module 312 is that: if the call module 312 cannot determine a subscription location of the user voice communication number, the call module 312 may adjust the user voice communication number (e.g., deciding how to adjust the user voice communication number based on the specific failure reasons corresponding to the current call), and after the adjustment, the call module 312 performs the operation of calling the user again; for example, the call module 312 dials 0 before the user voice communication number and then calls the user again; for another example, the call module 312 deletes the 0 added before the user voice communication number and then calls the user again.

Another specific example of repeating a call by the call module 312 is that: if abnormality occurs to a caller number used by the call module 312 for the current call (e.g., the caller number is screened by the PSTN), the call module 312 may perform the operation of calling the user again using other caller numbers. In other words, a plurality of caller numbers are provided in the call module 312; in the case that the call module 312 fails to successfully establish a voice call connection with the user side due to the cause from the caller number, the call module 312 should change the caller number, and try again to establish a voice call connection with the user side using the new caller number.

A further specific example of repeating a call by the call module 312 is that: in the cast that although a voice call connection with the user side has been successfully established for the current call, the voice verification information fails to be successfully played due to causes like connection interruption, the call module 312 may perform the operation of calling the user again so as to be capable of successfully playing the voice verification information.

The monitoring recording module 322 is mainly adapted to monitor a call to a user, and perform automatic listening and recording operation when monitoring that the user is called, so as to obtain the voice authentication information played by the network side for a voice verification request; and upon termination of the call, the monitor recording module 322 sends recording information obtained from the recording to the network side such that the voice verification module 313 may perform voice verification according to the recording information.

Specifically, the monitoring recording module 322 may enter into a call monitoring status after the voice verification requesting module 321 sends a voice verification request, e.g., the monitoring recording module 322 enters into the call monitoring status after initiating a verification service; when an incoming call is monitored, the monitoring recording module 322 automatically performs an listening operation, and records the audio signal played in the voice call connection by invoking a recording service and the like; upon termination of the present call (e.g., the call is hung up), the monitoring recording module 322 automatically sends a voice verification message containing recording information to the network side (e.g., the control module 311), e.g., the monitoring recording module 322 sends the recording information to the control module 311 through HTTP, and the control module 311 provides the recording information to the voice verification module 313, such that the voice verification module 313 may perform a voice verification operation for the voice verification message.

In order to avoid performing automatic listening and recording operation to other calls (calls irrelevant to verification), the monitoring recording module 322 pre-stores a call-monitored whitelist, and the monitoring recording module 322 can only perform automatic listening and automatic recording operation when the calling party of the monitored call is a calling party in the pre-stored call whitelist; otherwise, the monitoring recording module 322 does not perform automatic listening and automatic recording operation.

When the monitoring recording module 322 receives the identifier corresponding to the voice verification information, the monitoring recording module 322 may send the recording information, together with the received identifier, to the control module 311, e.g., the monitoring recording module 322 sends an HTTP-based voice verification message containing the recording information and the identifier to the control module 311.

Continued with the above example, when the user equipment where the voice verification requesting module 321 is located is not the user equipment where the monitoring recording module is located, the monitoring recording module 322, after receiving the identifier corresponding to the voice verification information sent from the voice verification requesting module 321 and the recipient information for the voice verification request, buffers the identifier and the recipient information for the voice verification request, and upon transmission of the recording information to the control module 311, sends the identifier and the recording information together to the control module 311 based on the recipient information.

The voice verification module 313 is mainly adapted to determine a voice verification result according to the voice verification information and the recording information from the user side.

Specifically, the voice verification module 313 may performs a voice matching operation after pre-processing the recording information it receives (e.g., the recording information sent from the control module 311), so as to enhance the accuracy of the voice matching operation. The pre-processing here refers to a noise reduction processing and a normalization processing.

A specific example of determining, by the voice verification module 313, a verification result is that: the voice verification module 313 performs voice matching between the received recording information and respective voice verification information stored locally, respectively, and when the voice verification information matching the recording information is the voice verification information previously determined by the control module 311, determines that the voice verification at this time passes; otherwise, it is determined that the voice verification at this time fails.

Another specific example of determining, by the voice verification module 313, a verification result is that: the voice verifying module 313 performs voice matching between the received recording information and the voice verification information previously determined by the control module 311, and when a voice matching result is that they match, the voice verifying module 313 determines that the voice verification at this time passes, while when the voice matching result is that they do not match, the voice verification module 313 determines that the voice verification at this time fails.

In the case that the voice verifying module 313 not only receives the recording information, but also receives the identifier corresponding to the voice verification information sent from the user side, a specific example of determining, by the voice verifying module 313, a verification result is that the voice verification module 313 singles out part of voice verification information from all voice verification information stored locally, performs voice matching between the received recording information and the part of voice verification information, respectively, and when the voice verification information matched with the recording information is the voice verification information previously determined by the control module 311, the voice verifying module 313 determines that the voice verification at this time passes; otherwise, the voice verifying module 313 determines that the voice verification at this time fails.

The voice verification module 313 may also adopt other manners to perform voice verification using the identifier and the recording information, e.g., in the case of determining that the identifier sent from the user matches the previously determined identifier and the recording information also matches the voice verification information as previously determined, the voice verification module 313 determines that the voice verification at this time passes; otherwise, the voice verification module 313 determines that the voice verification at this time fails.

It is seen from the depiction above that the identifier corresponding to the voice verification information in the embodiment may act as auxiliary information during the process of determining a voice verification, e.g., it may reduce the times of voice matching or act as a condition for determining a voice verification.

The voice matching process of the voice verification module 313 may comprise: extracting features in the recording information, and comparing the extracted features with features in the voice verification; features of respective voice verification information in the present embodiment may be pre-extracted and stored locally at the voice verification module 313. The voice matching process of the voice verification module 313 may also comprise: performing voice recognition to the recording information, and comparing a voice recognition result of the recording information with a voice recognition result of the voice verification information; the voice recognition results of respective voice verification information in the present embodiment may be voice recognition performed in advance and stored at the network side. Of course, the voice verification module 313 may also employ other voice matching algorithm to perform voice matching. The present embodiment does not limit the specific implementation manner of voice matching performed by the voice verification module 313.

When the voice verification passes, the network side (e.g., the control module 311) may enter into a subsequent processing procedure (e.g., subsequent payment procedure or subsequent user logon procedure, etc.). In addition, when the present payment procedure is completed (regardless of success or failure) or the logon procedure is completed (regardless of logon failure or logon success), the monitoring recording module 322 may not monitor the user call any longer, e.g., the monitoring recording module 322 closes the currently started monitoring service.

Embodiment 4: Voice Verification Apparatus

Figure 4:
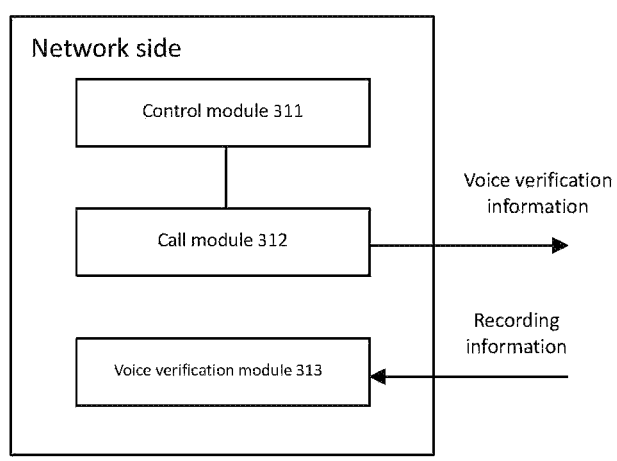
FIG. 4 illustrates a schematic diagram of a voice verification apparatus according to a fourth embodiment of the present invention.

A main structure of the voice verification apparatus is shown in FIG. 4.

The voice verification apparatus in FIG. 4 comprises: a control module 311, a call module 312, and a voice verification module 313, which are provided at the network side. The control module 311, the call module 312, and the voice verification module 313 may be integrated in a same device at the network side, or separately disposed in two or three mutually independent devices at the network side.

The control module 311 is mainly adapted to obtain a user voice communication number according to a voice verification request from a user side, and determine voice verification information corresponding to the voice verification request.

The call module 312 is mainly adapted to initiate a call to a corresponding user according to the user voice communication number obtained by the control module 311, and play voice verification information to the user in the case of call through.

The voice verification module 313 is mainly adapted to determine a voice verification result according to the voice verification information determined by the control module 311 and the recording information from the user side.

The specific operations performed by the control module 311, the call module 312, and the voice verification module 313 have been described in Embodiment 2 and Embodiment 3 above; for Embodiment 2, the control module 311 may be provided in a payment server; the call module 312 may be provided in a call center, while the voice verification module 313 may be provided in the voice matching server and the payment server (i.e., the voice matching portion of the voice verification module 313 is executed by a voice matching server, while the payment server executes determination of the voice verification result portion according to the voice matching result), which will not be explained repetitively.

Embodiment 5 Voice Verification Apparatus

Figure 5:
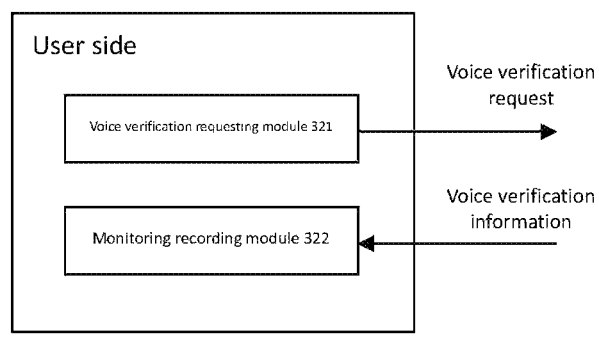
FIG. 5 illustrates a schematic diagram of a voice verification apparatus according to a fifth embodiment of the present invention.

A main structure of the voice verification module in the present embodiment is illustrated in FIG. 5.

The voice verification module in FIG. 5 comprises: a voice verification requesting module and a monitoring recording module 322, which are provided at the user side.

The voice verification requesting module 321 and the monitoring recording module 322 in the present embodiment may be provided in the same user equipment at the user side, e.g., they are both provided in one smart mobile phone; the voice verification request module 321 and the monitoring recording module 322 may also be provided in two mutually independent devices, respectively, e.g., the voice verification request module 321 is provided in a PC or tablet computer, while the monitoring recording module 322 is provided within the smart mobile phone.

The voice verification requesting module 321 is mainly adapted to send a voice verification request to the network side.

The monitoring recording module 322 is mainly adapted to monitor a call from the network side to the user, and when monitoring that the user is called, perform automatic pickup and recording operation so as to obtain the voice verification information played by the network side in response to the voice verification request; upon termination of the call, the monitoring recording module 322 sends recording information obtained from recording to the network side such that the network side may perform voice verification according to the recording information.

The specific operations performed by the voice verification requesting module 321 and the monitoring recording module 322 have been described in Embodiment 2 and Embodiment 3; a specific example of the voice verification requesting module 321 and the monitoring recording module 322 is the wireless payment client in Embodiment 2, which will not be repetitively explained here.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Although exemplary embodiments have been specifically illustrated and described above, those skilled in the art will understand that without departing from the spirit and scope of the claims, their forms and details may change somewhat. Here, the protection as sought is defined in the appended claims. These and other aspects of respective embodiments are prescribed in the following numbered clauses:

1. A method of voice verification, comprising steps of:

at a network side, obtaining a user voice communication number according to a voice verification request from a user side, and determining voice verification information corresponding to the voice verification request;

at the network side, initiating a call to a corresponding user according to the user voice communication number, and in the case of call through, playing the determined voice verification information to the user;

at the user side, performing an automatic listening and recording operation when monitoring that the user is called, and upon termination of the call, sending recording information obtained from the recording to the network side;

at the network side, determining a verification result according to the voice verification information and the recording information.

2. The method according to clause 1, wherein the determining voice verification information corresponding to the voice verification request further comprises:

randomly selecting an audio file from a plurality of preset audio files, and using the randomly selected audio file as voice verification information corresponding to the voice verification request; or randomly generating an audio file for the voice verification request, and using the randomly generated audio file as the voice verification information corresponding to the voice verification request.

3. The method according to clause 1, wherein the determining voice verification information corresponding to the voice verification request further comprises:

obtaining an identification of the voice verification information, and providing the identifier to the user side;

and the sending recording information obtained from recording to the network side comprises:

sending the recording information obtained from recording and the identifier together to the network side.

4. The method according to clause 3, wherein the determining a voice verification result according to the voice verification information and the recording information comprises:

selecting a plurality of voice verification information according to the received identifier, and performing voice matching between the recording information and the selected plurality of voice verification information, respectively;

in the case of determining that the voice verification information matching the recording information is the voice verification information corresponding to the voice verification request, determining that the voice verification passes; otherwise, determining that the voice verification fails.

5. The method according to any one of claims 1-4, wherein the performing an automatic listening and recording operation when monitoring that the user is called comprises:

performing an automatic listening and recording operation when monitoring that the user is called and the calling party belongs to a calling party in a whitelist.

6. A method of voice verification, comprising steps of:

sending a voice verification request to a network side;

monitoring a call from the network side to a user, and in the case of monitoring that the user is called, performing automatic listening and recording operation so as to obtain voice verification information performed by the network in response to the voice verification request;

upon termination of the call, sending recording information obtained from recording to the network side, such that the network side performs voice verification according to the recording information.

7. The method according to clause 6, further comprising:

receiving an identifier of the voice verification information sent from the network side;

and the sending recording information obtained from recording to the network side comprises:

sending the recording information obtained from the recording and the identifier together to the network side;

wherein the identifier is for performing voice verification along with the recording information.

8. The method according to clause 6 or 7, wherein the performing automatic listening and recording operation in the case of monitoring that the user is called comprises:

performing an automatic listening and recording operation when monitoring that the user is called and the calling party belongs to a calling party in a whitelist.

9. A method of voice verification, comprising steps of:

obtaining a user voice communication number according to a voice verification request from a user side, and determining voice verification information corresponding to the voice verification request;

initiating a call to a corresponding user according to the user voice communication number, and in the case of call through, playing the voice verification information to the user;

determining a voice verification result according to the voice verification information and recording information received from the user side, wherein the recording information refers to: at the user side, information obtained from performing an automatic listening and recording operation when monitoring that the user is called.

10. The method according to clause 9, wherein the determining voice verification information corresponding to the voice verification request comprises:

randomly selecting an audio file from a plurality of preset audio files, and using the randomly selected audio file as voice verification information corresponding to the voice verification request; or randomly generating an audio file for the voice verification request, and using the randomly generated audio file as the voice verification information corresponding to the voice verification request.

11. The method according to clause 9 or 10, wherein the determining voice verification information corresponding to the voice verification request further comprises:

obtaining an identifier of the voice verification information, and providing the identifier to the user side;

and the sending recording information obtained from recording to the network side comprises:

sending the recording information obtained from recording and the identifier together to the network side.

12. The method according to clause 11, wherein the determining a voice verification result according to the voice verification information and the recording information comprises:

selecting a plurality of voice verification information according to the received identifier, and performing voice matching between the recording information and the selected plurality of voice verification information, respectively;

in the case of determining that the voice verification information matching the recording information is the voice verification information corresponding to the voice verification request, determining that the voice verification passes; otherwise, determining that the voice verification fails.

13. An apparatus for voice verification, provided at a user side, wherein the apparatus comprises:
a voice verification requesting module adapted to send a voice verification request to a network side;
a monitoring recording module adapted to monitor a call from the network side to a user, and perform automatic listening and recording operation in the case of monitoring that the user is called, so as to obtain voice verification information played by the network side in response to the voice verification request; and upon termination of the call, send recording information obtained from recording to the network side such that the network side performs voice verification according to the recording information.

14. The apparatus according to clause 13, wherein the voice verification requesting module is also adapted to:
receive an identifier of the voice verification information sent from the network side;
and the monitoring recording module is specifically adapted to:
send the recording information obtained from the recording and the identifier together to the network side;
wherein the identifier is for performing voice verification along with the recording information.

15. The apparatus according to clause 13 or 14, wherein the monitoring recording module is specifically adapted to:
perform an automatic listening and recording operation when monitoring that the user is called and the calling party belongs to a calling party in a whitelist.

16. An apparatus for voice verification, provided at a network side, wherein the apparatus comprises:
a control module adapted to obtain a user voice communication number according to a voice verification request from a user side, and determine voice verification information corresponding to the voice verification request;
a call module adapted to initiate a call to a corresponding user according to the user voice communication number, and in the case of call through, play the voice verification information to the user;
a voice verification module adapted to determine a voice verification result according to the voice verification information and recording information received from the user side, wherein the recording information refers to: at the user side, information obtained from performing an automatic listening and recording operation when monitoring that the user is called.

17. The apparatus according to clause 16, wherein the control module is specifically adapted to:
randomly select an audio file from a plurality of preset audio files, and use the randomly selected audio file as voice verification information corresponding to the voice verification request; or randomly generate an audio file for the voice verification request, and use the randomly generated audio file as the voice verification information corresponding to the voice verification request.

18. The apparatus according to clause 16 or 17, wherein the control module is further adapted to:
obtain an identifier of the voice verification information, and provide the identifier to the user side;
and the control module is specifically adapted to receive the recording information and the identifier from the user side.

19. The apparatus according to clause 18, wherein the voice verification module is specifically adapted to:
select a plurality of voice verification information according to the received identifier, and perform voice matching between the recording information and the selected plurality of voice verification information, respectively;
in the case of determining that the voice verification information matching the recording information is the voice verification information corresponding to the voice verification request, determine that the voice verification passes; otherwise, determine that the voice verification fails.

20. A system of voice verification, comprising:
the apparatus according to any one of clauses 13-15 and the apparatus according to any one of clauses 16-19.

The invention claimed is:
1. A method of voice verification, comprising steps of:
at a network side, obtaining a user voice communication number according to a voice verification request from a user side, and determining voice verification information corresponding to the voice verification request;
at the network side, initiating a call to a corresponding user according to the user voice communication number, and in the case of call through, playing the determined voice verification information to the user;
at the user side, performing an operation of automatically listening and recording the played voice verification information when monitoring that the user is called, and upon termination of the call, sending recording information obtained from the recording to the network side; and
at the network side, determining a verification result according to the voice verification information and the recording information.

2. The method according to claim 1, wherein the determining voice verification information corresponding to the voice verification request further comprises:
randomly selecting an audio file from a plurality of preset audio files, and using the randomly selected audio file as voice verification information corresponding to the voice verification request; or
randomly generating an audio file for the voice verification request, and using the randomly generated audio file as the voice verification information corresponding to the voice verification request.

3. The method according to claim 1, wherein the determining voice verification information corresponding to the voice verification request further comprises:
obtaining an identifier of the voice verification information, and providing the identifier to the user side;
and sending recording information obtained from recording to the network side comprises:
sending the recording information obtained from recording and the identifier together to the network side.

4. The method according to claim 3, wherein the determining a voice verification result according to the voice verification information and the recording information comprises:
selecting a plurality of voice verification information according to the received identifier, and performing voice matching between the recording information and the selected plurality of voice verification information, respectively;
in the case of determining that the voice verification information matching the recording information is the voice verification information corresponding to the voice verification request, determining that the voice verification passes; otherwise, determining that the voice verification fails.

5. The method according to claim 1, wherein the performing an operation of automatically listening and recording when monitoring that the user is called comprises:
performing the operation of automatically listening and recording the played voice verification information when monitoring that the user is called and the calling party belongs to a calling party in a whitelist.

6. A method of voice verification, comprising steps of:
sending a voice verification request to a network side;
monitoring a call from the network side to a user, and in the case of monitoring that the user is called, performing an operation of automatically listening and recording played voice verification information so as to obtain voice verification information performed by the network in response to the voice verification request; and
upon termination of the call, sending recording information obtained from recording to the network side, such that the network side performs voice verification according to the recording information.

7. The method according to claim 6, further comprising:
receiving an identifier of the voice verification information sent from the network side;
and the sending recording information obtained from recording to the network side comprises:
sending the recording information obtained from the recording and the identifier together to the network side;
wherein the identifier is for performing voice verification along with the recording information.

8. The method according to claim 6, wherein the performing an operation of automatically listening and recording in the case of monitoring that the user is called comprises:
performing the operation of automatically listening and recording when monitoring that the user is called and the calling party belongs to a calling party in a whitelist.

9. A method of voice verification, comprising steps of:
obtaining a user voice communication number according to a voice verification request from a user side, and determining voice verification information corresponding to the voice verification request;
initiating a call to a corresponding user according to the user voice communication number, and in the case of call through, playing the voice verification information to the user; and
determining a voice verification result according to the voice verification information and recording information received from the user side, wherein the recording information refers to: at the user side, information obtained from performing an operation of automatically listening and recording the played voice verification information when monitoring that the user is called.

10. The method according to claim 9, wherein the determining voice verification information corresponding to the voice verification request comprises:
randomly selecting an audio file from a plurality of preset audio files, and using the randomly selected audio file as voice verification information corresponding to the voice verification request; or
randomly generating an audio file for the voice verification request, and using the randomly generated audio file as the voice verification information corresponding to the voice verification request.

11. The method according to claim 9, wherein the determining voice verification information corresponding to the voice verification request further comprises:
obtaining an identifier of the voice verification information, and providing the identifier to the user side;
and the sending recording information obtained from recording to the network side comprises:
sending the recording information obtained from recording and the identifier together to the network side.

12. The method according to claim 11, wherein the determining a voice verification result according to the voice verification information and the recording information comprises:
selecting a plurality of voice verification information according to the received identifier, and performing voice matching between the recording information and the selected plurality of voice verification information, respectively;
in the case of determining that the voice verification information matching the recording information is the voice verification information corresponding to the voice verification request, determining that the voice verification passes; otherwise, determining that the voice verification fails.

13. An apparatus for voice verification, provided at a user side, wherein the apparatus comprises:
a voice verification requesting module adapted to send a voice verification request to a network side; and
a monitoring recording module adapted to monitor a call from the network side to a user, and perform an operation of automatically listening and recording the played voice verification information in the case of monitoring that the user is called, so as to obtain voice verification information played by the network side in response to the voice verification request; and upon termination of the call, send recording information obtained from recording to the network side such that the network side performs voice verification according to the recording information.

14. The apparatus according to claim 13, wherein the voice verification requesting module is also adapted to:
receive an identifier of the voice verification information sent from the network side;
and the monitoring recording module is specifically adapted to:
send the recording information obtained from the recording and the identifier together to the network side;
wherein the identifier is for performing voice verification along with the recording information.

15. The apparatus according to claim 13, wherein the monitoring recording module is specifically adapted to:
perform the operation of automatically listening and recording when monitoring that the user is called and the calling party belongs to a calling party in a whitelist.

16. An apparatus for voice verification, provided at a network side, wherein the apparatus comprises:
a control module adapted to obtain a user voice communication number according to a voice verification request from a user side, and determine voice verification information corresponding to the voice verification request;
a call module adapted to initiate a call to a corresponding user according to the user voice communication number, and in the case of call through, play the voice verification information to the user; and a voice verification module adapted to determine a voice verification result according to the voice verification information and recording information received from the user side, wherein the recording information refers to: at the user side, information obtained from performing an operation of automatically listening and recording the played voice verification information when monitoring that the user is called.

17. The apparatus according to claim 16, wherein the control module is specifically adapted to:
randomly select an audio file from a plurality of preset audio files, and use the randomly selected audio file as voice verification information corresponding to the voice verification request; or
randomly generate an audio file for the voice verification request, and use the randomly generated audio file as the voice verification information corresponding to the voice verification request.

18. The apparatus according to claim 16, wherein the control module is further adapted to:
obtain an identifier of the voice verification information, and provide the identifier to the user side;
and the control module is specifically adapted to receive the recording information and the identifier from the user side.

19. The apparatus according to claim 18, wherein the voice verification module is specifically adapted to:
select a plurality of voice verification information according to the received identifier, and perform voice matching between the recording information and the selected plurality of voice verification information, respectively; and
in the case of determining that the voice verification information matching the recording information is the voice verification information corresponding to the voice verification request, determine that the voice verification passes; otherwise, determine that the voice verification fails.

20. A system of voice verification, comprising:
a first apparatus at a user side, wherein the first apparatus comprises:
a voice verification requesting module adapted to send a voice verification request to a network side;
a monitoring recording module adapted to monitor a call from the network side to a user, and perform an operation of automatically listening and recording the played voice verification information in the case of monitoring that the user is called, so as to obtain voice verification information played by the network side in response to the voice verification request; and upon termination of the call, send recording information obtained from recording to the network side such that the network side performs voice verification according to the recording information; and
a second apparatus at a network side, wherein the second apparatus comprises:
a control module adapted to obtain a user voice communication number according to a voice verification request from a user side, and determine voice verification information corresponding to the voice verification request;
a call module adapted to initiate a call to a corresponding user according to the user voice communication number, and in the case of call through, play the voice verification information to the user; and
a voice verification module adapted to determine a voice verification result according to the voice verification information and recording information received from the user side, wherein the recording information refers to: at the user side, information obtained from performing the operation of automatically listening and recording the played voice verification information when monitoring that the user is called.

21. A computer readable medium, the computer readable medium storing computer codes which, when being executed, cause the method according to claim 1 to be executed.

22. A computer program product which, when being executed by a computer device, causes the method according to claim 1 to be executed.

23. A computer device that comprises a memory and a processor, wherein the memory stores computer codes, and the processor is configured to execute the method according to claim 1 by executing the computer codes.

* * * * *